UNITED STATES PATENT OFFICE.

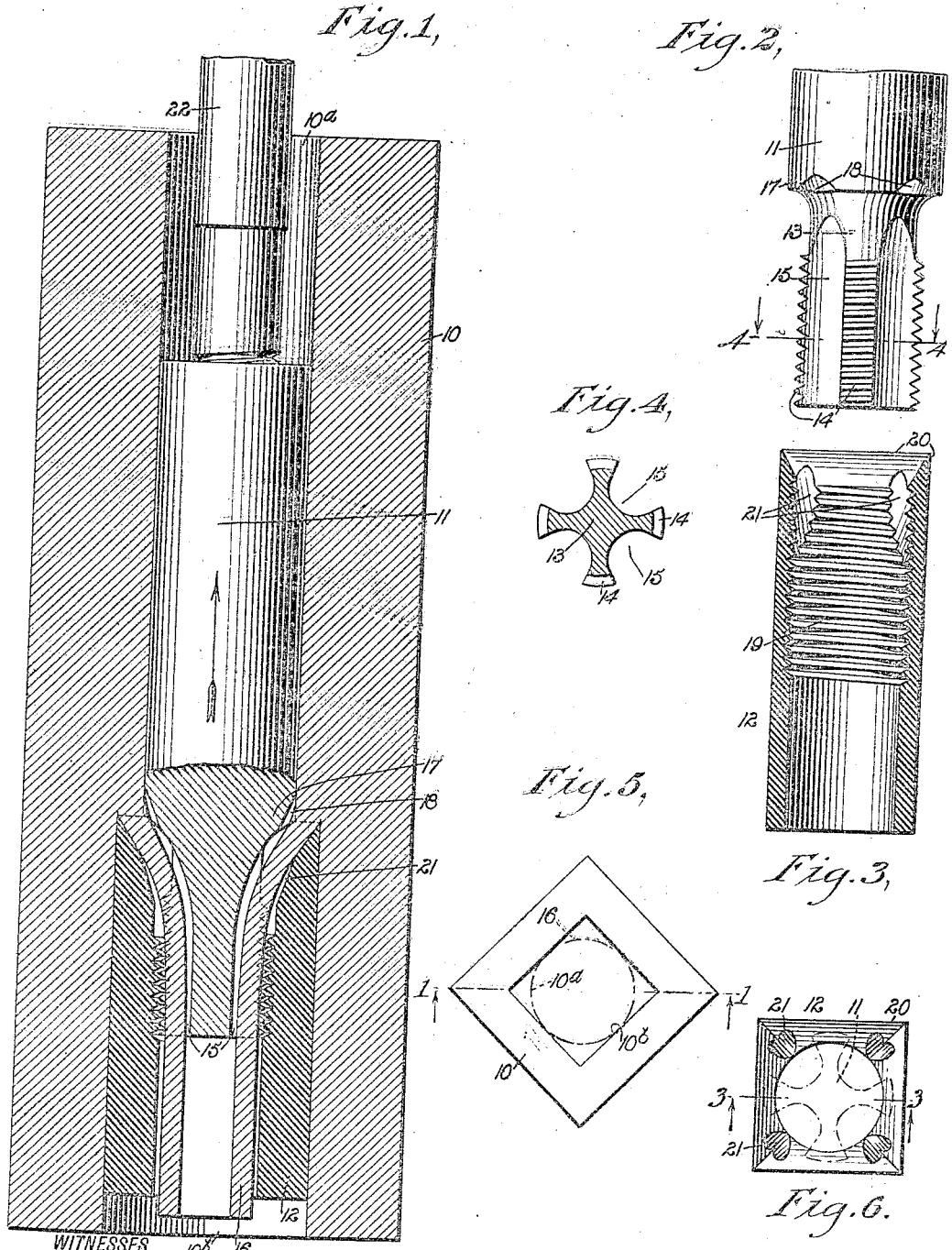

FRANK OLWIN FURBER, OF SACO, MAINE.

BROACHING-TOOL.

1,243,504.   Specification of Letters Patent.   Patented Oct. 16, 1917.

Application filed February 2, 1917. Serial No. 146,138.

*To all whom it may concern:*

Be it known that I, FRANK O. FURBER, a citizen of the United States, and a resident of Saco, in the county of York and State of Maine, have invented a new and Improved Broaching-Tool, of which the following is a full, clear, and exact description.

This invention relates to woodworking tools and has particular reference to broaching or forming of square or other polygonal holes in long pieces of timber.

Among the special objects of this improvement is to provide means whereby the cutting portion of the tool may readily be separated from the other parts and sharpened when necessary.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a vertical longitudinal section showing the tool in operation, the section being on a diagonal plane indicated by line 1—1 of Fig. 5;

Fig. 2 is a side elevation of the cylindrical body portion of the tool with its threaded extension;

Fig. 3 is a vertical sectional view of the cutter on the line 3—3 of Fig. 6;

Fig. 4 is a transverse sectional detail on the line 4—4 of Fig. 2;

Fig. 5 is a diagram indicating an end view of a piece of timber having a square hole formed therein after the manner indicated in Fig. 1, this figure being on a smaller scale than Fig. 1; and Fig. 6 is a plan or end view of the sharp end of the cutting member shown in Fig. 3.

Referring now more particularly to the drawings, I show a device for forming square holes longitudinally through long pieces of timber, such as hollow columns, pump stocks, or the like, such a piece of timber being indicated at 10.

The tool comprises two principal parts, the body 11 and cutter 12. The body 11 is cylindrical and is provided with a central longitudinal extension 13 at one end having an exterior set of screw threads 14. The shank 13 is formed with four longitudinal grooves 15 extending radially toward the center of the shank and of ample depth to accommodate the slices of material indicated at 16 removed by the tool from the interior portion of the stick 10. The shoulder portion 17 opposite the end of the shank is notched out at 18 directly in alinement with the several grooves 15 to facilitate the delivery of the slices or slivers 16 into and through the cutting portion of the tool and through the grooves 15.

The cutter 12 is shown as of square form in cross section for the formation of a square hole, but provided with a central socket or opening longitudinally therethrough, having an internal thread 19. With respect to the number of sides or angles for the cutting tool and number of grooves 15, it will be understood that these features will be made in accordance with the shape of the hole to be formed. The threaded portion of the cutter is adapted to receive the shank 13 of the body 10, bringing the square cutting edge 20 of the cutter practically in the plane of the shoulder 17 of the body. The inner surface of the cutter is provided with notches 21, one notch 21 being provided for each groove 15 and notch 18 of the body. Each notch 21, as indicated in Fig. 6, is located directly inwardly from the corner of the cutter and when the parts are assembled for operation, the corners of the cutter will lie in the same radial planes as the respective notches and grooves aforesaid.

The operation of the device is as follows: With the stick 10 formed with a longitudinal bore or hole 10$^a$, through which the body 11 is adapted to be drawn by any suitable power means applied through a rod 22 and with the cutter 12 secured to the body as described above and as shown in Fig. 1, the corners of the cutter will broach out the slices 16 while the tool is being drawn longitudinally through the stick, the several slices passing freely through the notched and grooved portions of the tool and thence through the hollow lower end of the cutter, forming a square hole 10$^b$ in the stick. I am aware that it is not broadly new to provide a broaching tool of this general character, but so far as I am aware, the sharp cutting portions of such tools as ordinarily used are difficult to sharpen. By my improvement, however, I may easily remove the cutter from the body or shank and when so removed, it may easily be sharpened with a file, stone or other sharpening tool.

I claim:

1. In a broaching tool, the combination of a cylindrical body having a central longitudinal externally threaded extension at one end, said extension being provided with deep longitudinal grooves, a cutter member of exterior polygonal form and having an interior threaded bore adapted to receive the threaded shank, said cutter member having a sharp cutting edge located adjacent to the body portion and being notched interiorly radially outwardly from the several notches of the grooves of the shank, and means to draw the body and cutter members longitudinally.

2. In a broaching tool of the character set forth, the combination of a cylindrical body member having a reduced end shank forming a shoulder, said shank being externally threaded and provided with longitudinal grooves, the shoulder being notched in alinement with several grooves of the shank, and a cutter having a polygonal form in cross section provided with an interior threaded bore adapted to receive the threaded shank of the body, one end of the cutter member having a sharp cutting edge lying in the plane of said shoulder, the several cutting corners of the cutter being located radially outwardly from the notches and grooves of the body and shank, said cutter member being provided also with interior notches, one notch being located directly inwardly from each corner thereof, and means to draw the tool longitudinally.

FRANK OLWIN FURBER.